(12) United States Patent
Hwang et al.

(10) Patent No.: US 11,737,936 B2
(45) Date of Patent: Aug. 29, 2023

(54) MOBILITY CARRIER PROVIDED WITH VEHICLE SEAT AND VEHICLE PROVIDED WITH MOBILITY CARRIER

(71) Applicants: Hyundai Motor Company, Seoul (KR); Kia Motors Corporation, Seoul (KR)

(72) Inventors: Jin Ho Hwang, Seoul (KR); Dong Eun Cha, Hwaseong-si (KR); Sang Heon Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 814 days.

(21) Appl. No.: 16/676,836

(22) Filed: Nov. 7, 2019

(65) Prior Publication Data
US 2020/0337918 A1  Oct. 29, 2020

(30) Foreign Application Priority Data

Apr. 23, 2019  (KR) .................. 10-2019-0047112

(51) Int. Cl.
*A61G 3/08* (2006.01)
*B60N 2/32* (2006.01)
(Continued)

(52) U.S. Cl.
CPC .......... *A61G 3/0808* (2013.01); *A61G 3/061* (2013.01); *B60N 2/32* (2013.01); *G05D 1/0088* (2013.01);
(Continued)

(58) Field of Classification Search
CPC .................. A61G 3/067; A61G 3/062
See application file for complete search history.

(56) References Cited

U.S. PATENT DOCUMENTS 3,204,791 A * 9/1965 Williams ................ B60K 1/00
                                                    296/61
3,905,436 A * 9/1975 Karchak, Jr. .......... A61G 5/125
                                                    180/907
(Continued)

FOREIGN PATENT DOCUMENTS

JP   2009-176295 A    8/2009
JP   2016-511666 A    4/2016
(Continued)

OTHER PUBLICATIONS

Pantograph, 1920-30.COM, Last Accessed Ju. 23, 2022, Available Online At https://web.archive.org/web/20160322070634/http://www.1920-30.com/toys/things-to-make/pantograph.html (Year: 2016).*

*Primary Examiner* — Daniel L Greene
(74) *Attorney, Agent, or Firm* — MORGAN, LEWIS & BOCKIUS LLP

(57) ABSTRACT

A mobility carrier provided with a vehicle seat and a vehicle provided with the mobility carrier. The mobility carrier includes a carrier body, a seat, an operating portion configured of allowing a user accommodated on the seat to control the mobility carrier or the vehicle, and a carrier controller. The carrier controller communicates with a vehicle controller of the vehicle from outside of the vehicle. If verified through communications with the vehicle controller, the carrier controller controls the carrier wheels so that the carrier body enters a cabin of the vehicle. The carrier controller communicates with the vehicle controller to control a driving unit of the vehicle via the operating portion.

19 Claims, 9 Drawing Sheets

(51) Int. Cl.
*A61G 3/06* (2006.01)
*G05D 1/00* (2006.01)
*B60K 1/04* (2019.01)

(52) U.S. Cl.
CPC .... *A61G 2203/10* (2013.01); *A61G 2220/145* (2013.01); *B60K 1/04* (2013.01); *B60K 2001/0438* (2013.01)

(56) References Cited

U.S. PATENT DOCUMENTS

| | | | | |
|---|---|---|---|---|
| 4,274,503 | A * | 6/1981 | Mackintosh | A61G 5/1051 180/907 |
| 5,466,111 | A * | 11/1995 | Meyer | B60N 2/245 414/800 |
| 6,105,706 | A * | 8/2000 | Cooper | B60N 2/24 297/344.11 |
| 9,834,118 | B2 | 12/2017 | Kunkel | |
| 10,406,047 | B1 * | 9/2019 | Runnels | A61G 5/104 |
| 2003/0127261 | A1 * | 7/2003 | Borroni-Bird | B60G 7/003 180/65.1 |
| 2006/0272893 | A1 * | 12/2006 | Foggio | A47C 16/025 182/69.1 |
| 2006/0290093 | A1 * | 12/2006 | Heine | B62D 1/00 280/264 |
| 2007/0020075 | A1 * | 1/2007 | Kelly, III | A61G 3/062 414/540 |
| 2007/0084648 | A1 * | 4/2007 | DuFresne | A61G 5/1059 180/907 |
| 2009/0274542 | A1 * | 11/2009 | Pocobello | A61G 3/067 414/522 |
| 2015/0034888 | A1 * | 2/2015 | Mancin | B66F 3/22 254/122 |
| 2015/0175227 | A1 * | 6/2015 | Chang | B60N 2/797 180/209 |
| 2017/0259811 | A1 * | 9/2017 | Coulter | B60W 10/20 |
| 2017/0282775 | A1 * | 10/2017 | Ochenkowski | B60P 3/122 |
| 2017/0355295 | A1 * | 12/2017 | Gutowitz | B60K 1/00 |
| 2018/0136655 | A1 * | 5/2018 | Kim | H04W 4/024 |
| 2018/0314263 | A1 * | 11/2018 | Aiuchi | A61G 3/0808 |

FOREIGN PATENT DOCUMENTS

| | | |
|---|---|---|
| KR | 10-0914960 B1 | 8/2009 |
| KR | 2016-0031072 A | 3/2016 |
| KR | 10-2019-0014642 A | 2/2019 |
| WO | WO 2014/124482 A1 | 8/2014 |

* cited by examiner

MOBILITY CARRIER PROVIDED WITH VEHICLE SEAT AND VEHICLE PROVIDED WITH MOBILITY CARRIER

CROSS REFERENCE TO RELATED APPLICATION

The present application claims priority to Korean Patent Application No. 10-2019-0047112, filed Apr. 23, 2019, the entire contents of which is incorporated herein for all purposes by this reference.

BACKGROUND OF THE PRESENT INVENTION

Field of the Invention

The present invention generally relates to a mobility carrier provided with a vehicle seat allowing the mobility carrier to serve as a seat of a vehicle when fitted in the vehicle while being ordinarily used as a mobility vehicle outside of a vehicle, and a vehicle provided with the mobility carrier.

Description of Related Art

Along with the recent development of autonomous driving technologies, there has been increasing demand for a variety of mobility vehicles. However, upwards to present, the concept of mobility vehicles has been considered separately from the concept of conventional vehicles. The concept of mobility vehicles which may be combined with vehicles has not been provided.

However, it may be economical and efficient from the perspective of consumers to own a combined system having a novel concept, in which a vehicle and a mobile vehicle is combined, to use both the vehicle and a mobile vehicle, instead of owning both a vehicle and a mobility vehicle.

According to the concept that has been provided upwards to present, a user may use a mobility vehicle by taking the mobility vehicle from a vehicle at a destination after having traveled a long distance, and the mobility vehicle may be charged separately at home. Accordingly, the use of the mobility vehicle is inconvenient.

The information included in this Background of the Invention section is only for enhancement of understanding of the general background of the invention and may not be taken as an acknowledgement or any form of suggestion that this information forms the prior art already known to a person skilled in the art.

BRIEF SUMMARY OF THE PRESENT INVENTION

Various aspects of the present invention are directed to providing a mobility carrier provided with a vehicle seat allowing the mobility carrier to serve as a seat of a vehicle when fitted in the vehicle while being ordinarily used as a mobility vehicle outside of a vehicle, and a vehicle provided with the mobility carrier.

In various aspects of the present invention, a mobility carrier may include: a carrier body; carrier wheels provided on the carrier body to move the carrier body outside of a vehicle; a seat provided on the carrier body such that a user is accommodated thereon; an operating portion configured of allowing the user accommodated on the seat to control the mobility carrier or the vehicle; and a carrier controller configured of communicating with a vehicle controller of the vehicle from outside of the vehicle, if verified through communications with the vehicle controller, controlling the carrier wheels so that the carrier body enters a cabin of the vehicle, and communicating with the vehicle controller to control a driving unit of the vehicle via the operating portion.

The mobility carrier may further include a carrier battery provided in a lower portion of the carrier body to providing driving energy to the carrier wheels.

In a case in which the mobility carrier is fitted within the vehicle, the carrier controller may charge the carrier battery using a main battery of the vehicle.

In a case in which the mobility carrier is fitted within the vehicle, the carrier controller may charge the main battery of the vehicle using the carrier battery if the main battery of the vehicle has a value of a state of charge (SOC) lower than a predetermined value.

The seat may be mounted on the carrier body via a moving portion to be movable above and relative to the carrier body.

The operating portion may include a steering wheel to steer the carrier wheels or wheels of the vehicle.

The carrier controller may be configured to control the carrier wheels to be steered via the steering wheel of the mobility carrier if the mobility carrier is located outside the vehicle and may control the wheels of the vehicle to be steered via the steering wheel of the mobility carrier if the mobility carrier is fitted within the vehicle.

The carrier controller may be configured to control the authority of control of the driving unit of the vehicle to be owned by the vehicle controller if the vehicle is in an autonomous driving mode and to be owned by the operating portion and the carrier controller of the mobility carrier if the vehicle is in a manual driving mode.

In a case in which the plurality of mobility carriers is fitted within the single vehicle, if the vehicle is in the manual driving mode, the authority of control of the driving unit of the vehicle may be owned by the operating portion and the carrier controller of the mobility carrier that are allowed to be controlled.

The authority of control of the driving unit of the vehicle may be determined via communications between the vehicle controller and the carrier controllers of the mobility carriers, and the authority of control of the driving unit may be sequentially owned by the carrier controller in a driver's seat, the carrier controller in a front passenger's seat, and the carrier controller in a rear passenger's seat.

In the autonomous driving mode of the vehicle, the carrier controller may lock the carrier wheels, preventing the mobility carriers from moving within the vehicle.

The seat may be mounted on the carrier body via the moving portion to be movable above and relative to the carrier body, and, in the autonomous driving mode of the vehicle, the carrier controller may allow the moving portion to be manipulated, so that the seat is moveable on the mobility carrier while the mobility carrier is unmovable within the vehicle.

The carrier controller may differently limit a range in which the moving portion is allowed to move, depending on whether or the carrier controller owns the authority of control of the driving unit of the vehicle.

According to various aspects of the present invention, a vehicle may include: the above-described mobility carrier; a moving board mounted in a lower portion of the vehicle to be slidable laterally with respect to the vehicle to be spread outwards from the vehicle or retracted into the lower portion of the vehicle; and a vehicle controller configured for controlling the moving board to be spread laterally from the vehicle so that the mobility carrier enters or exits the vehicle via the moving board in a case in which it is necessary for the mobility carrier outside the vehicle to enter the vehicle or the mobility carrier within the vehicle to exit the vehicle.

The vehicle controller may be configured to control the moving board to slide laterally from the vehicle it is necessary for the mobility carrier to move from the vehicle to another vehicle and may control the moving board to slide laterally from the vehicle and pivot downwards, so that an external edge portion of the moving board touches a ground, if it is necessary for the mobility carrier to move from the cabin of the vehicle to the ground.

According to the mobility carrier provided with a vehicle seat and the vehicle provided with the mobility carrier according to an exemplary embodiment of the present invention, the mobility carrier may be ordinarily used as a mobility vehicle outside of the vehicle while provided as a seat of the vehicle when fitted within the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
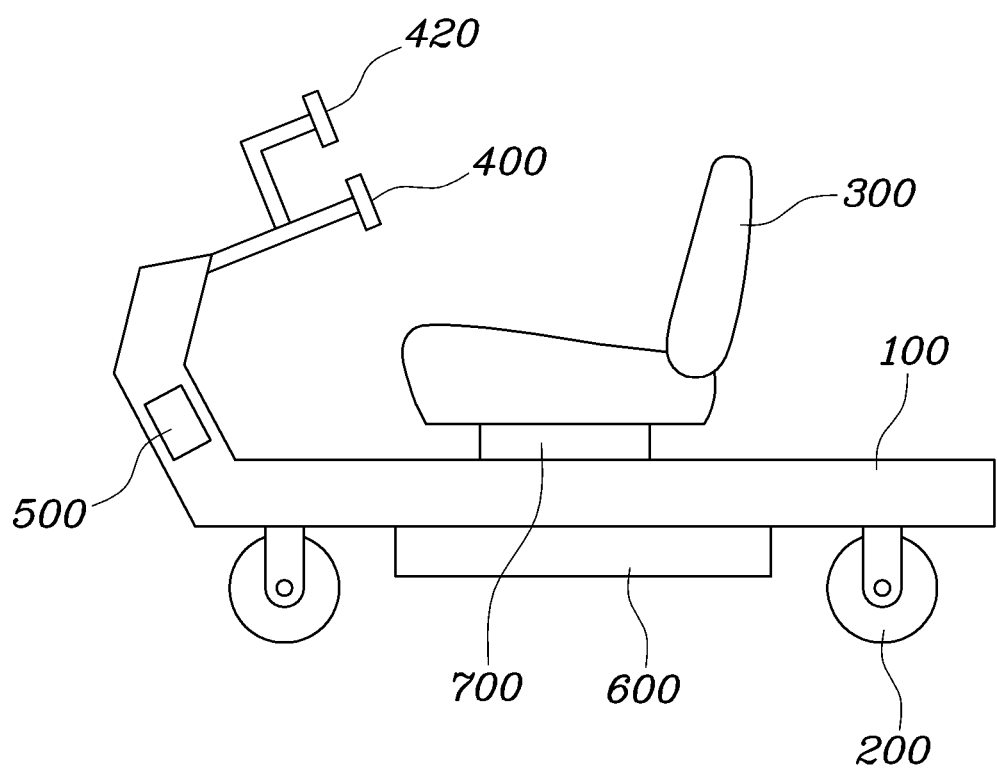
FIG. 1 is a configuration view exemplarily illustrating a mobility carrier provided with a vehicle seat according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
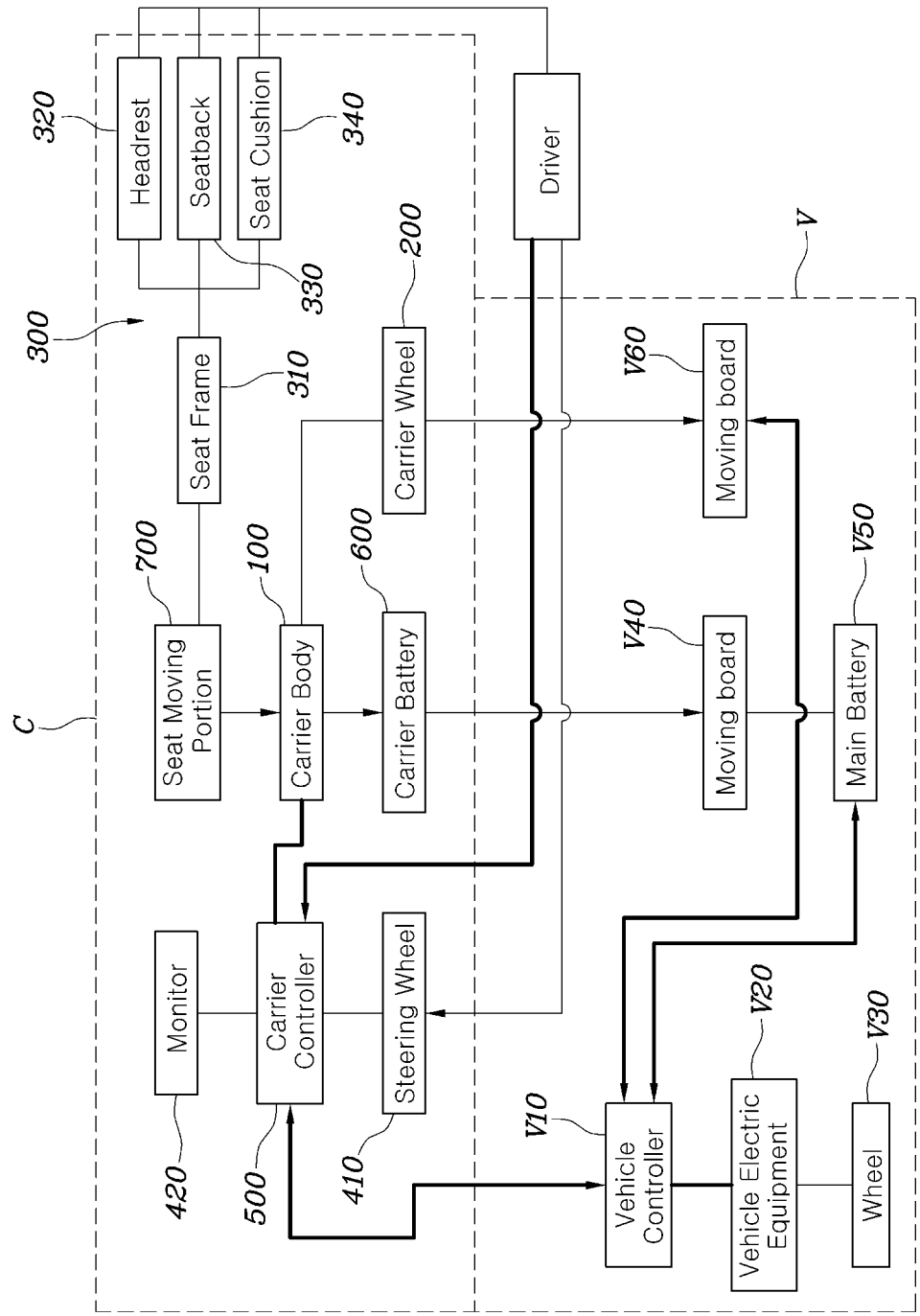
FIG. 2 is a block diagram illustrating the mobility carrier provided with a vehicle seat and a vehicle provided with the mobility carrier according to the exemplary embodiment of the present invention.
Figure 3:
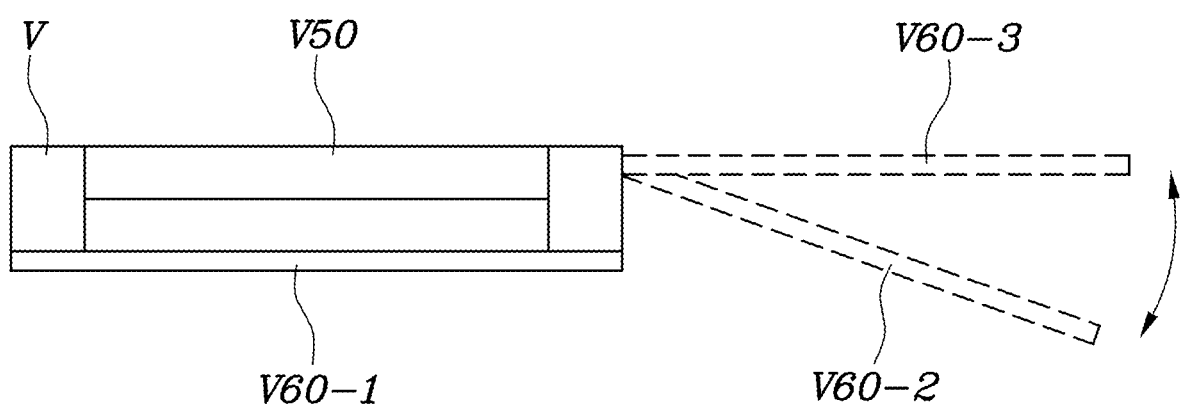
FIG. 3 is a view exemplarily illustrating a moving board of the vehicle provided with the mobility carrier according to the exemplary embodiment of the present invention.
Figure 4:
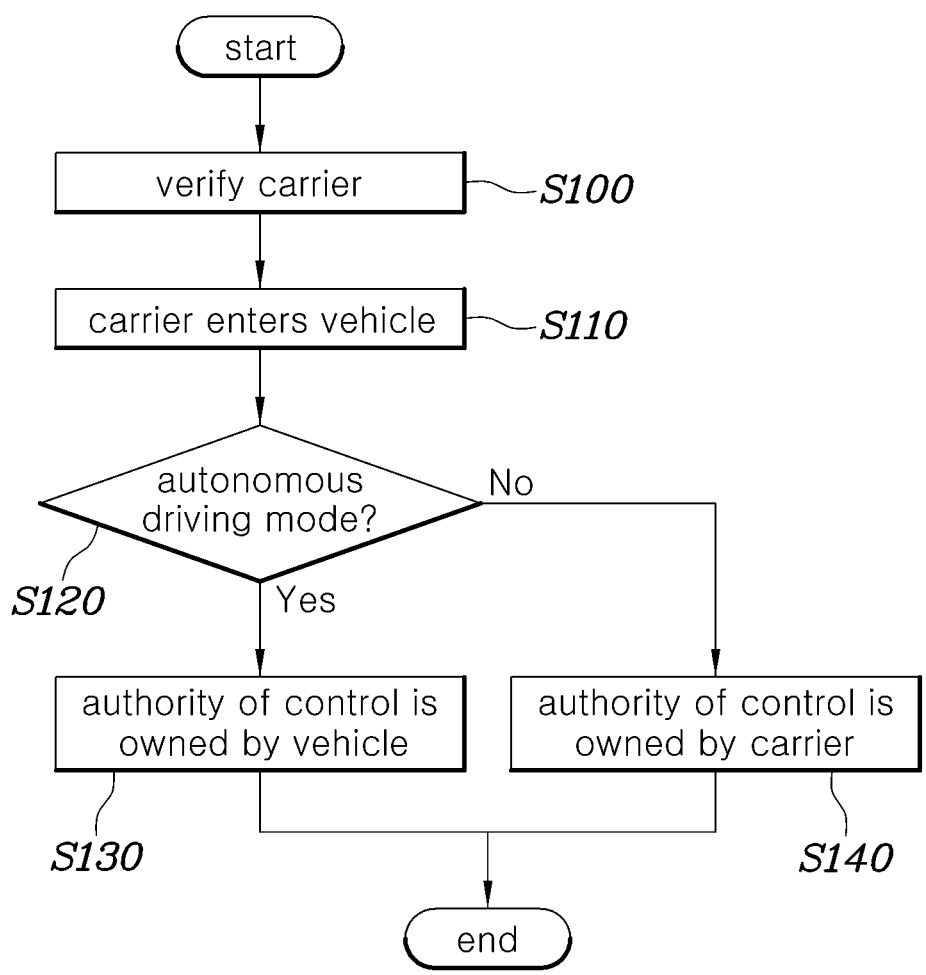
FIG. 4, FIG. 5 and FIG. 6 are flowcharts illustrating a process of controlling the mobility carrier provided with a vehicle seat and a vehicle provided with the mobility carrier according to the exemplary embodiment of the present invention.
Figure 5:
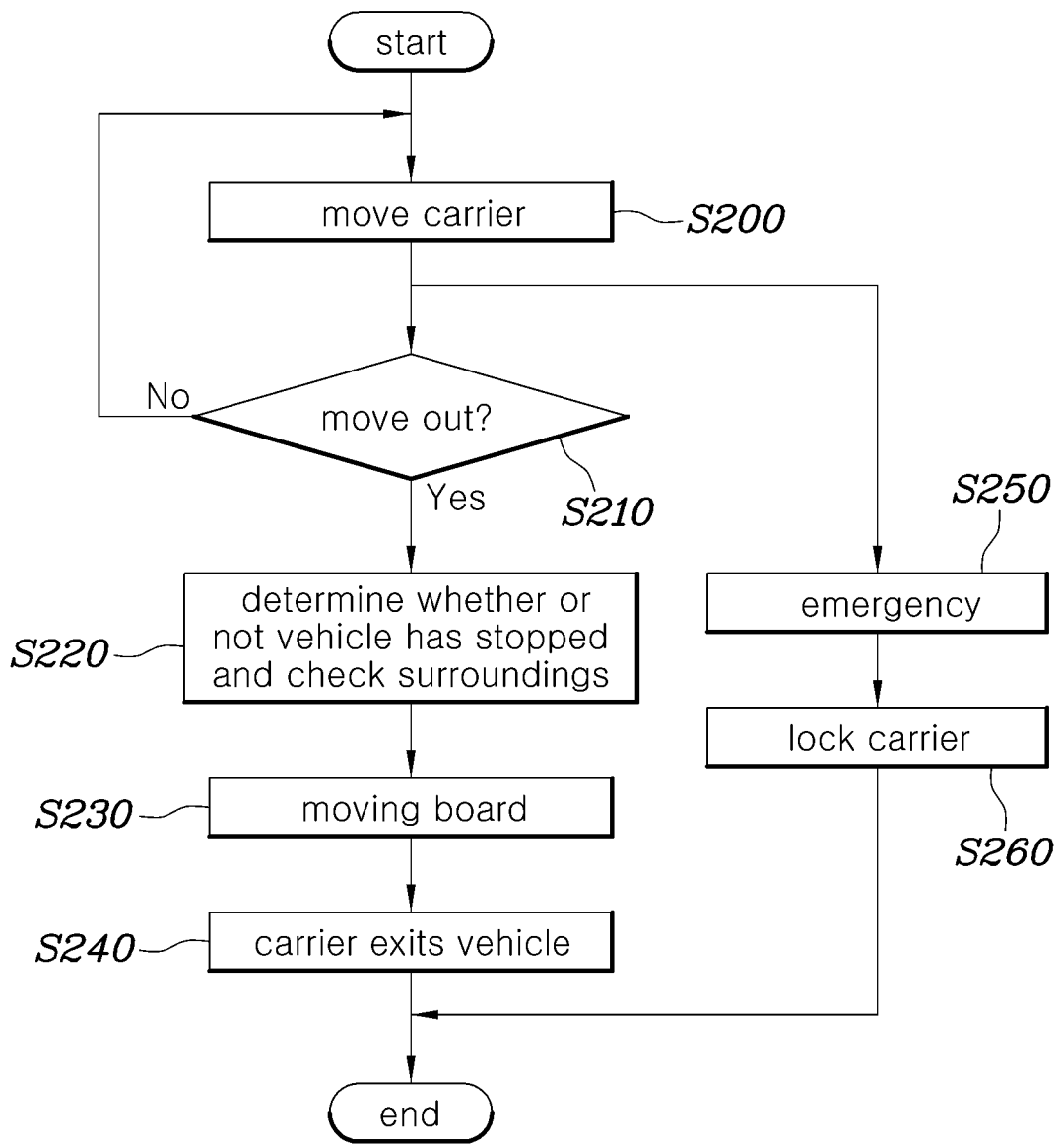
Figure 6:
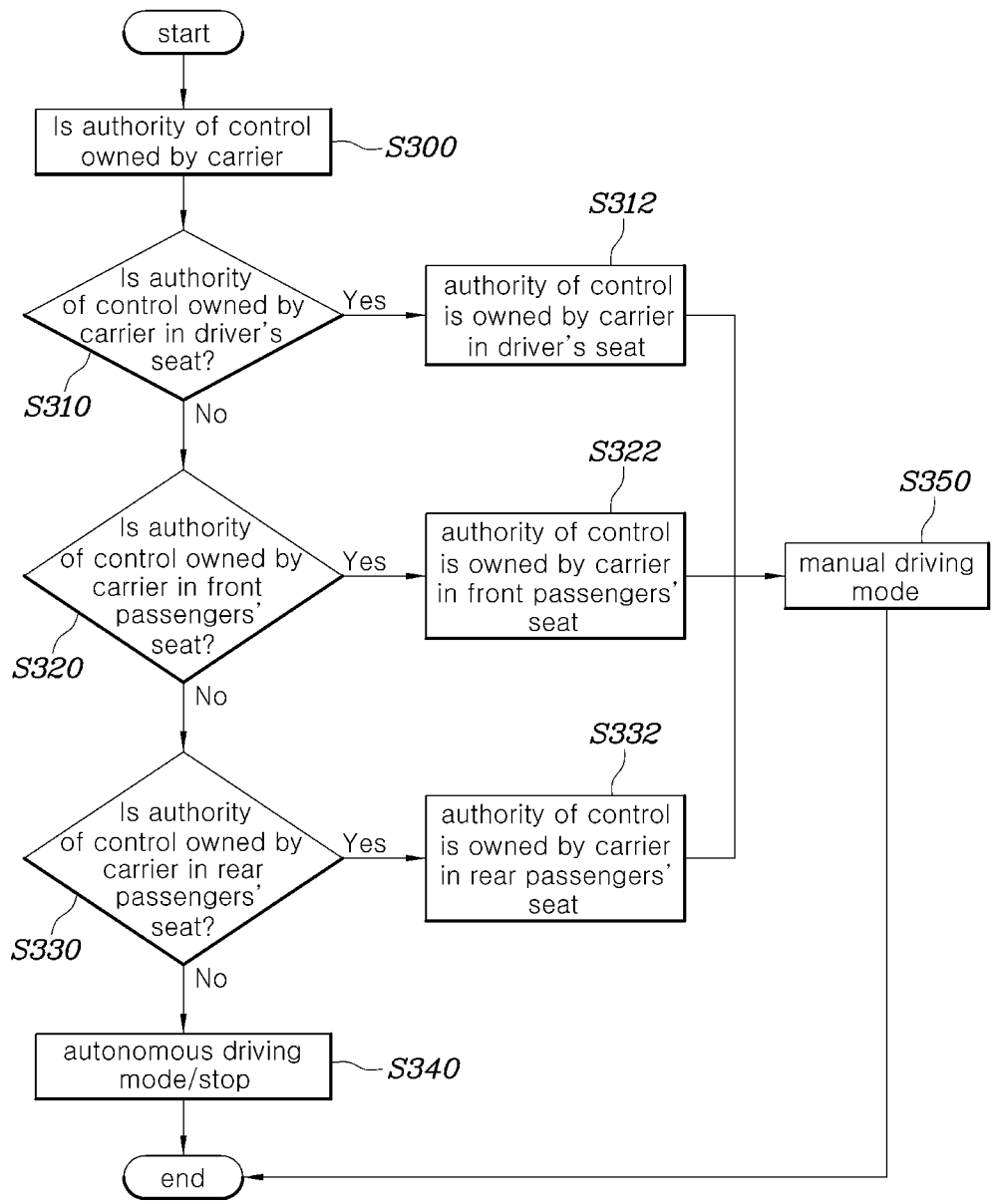

FIG. 1 is a configuration view exemplarily illustrating a mobility carrier provided with a vehicle seat according to an exemplary embodiment of the present invention, FIG. 2 is a block diagram illustrating the mobility carrier provided with a vehicle seat and a vehicle provided with the mobility carrier according to the exemplary embodiment of the present invention, FIG. 3 is a view exemplarily illustrating a moving board of the vehicle provided with the mobility carrier according to the exemplary embodiment of the present invention, and FIG. 4, FIG. 5 and FIG. 6 are flowcharts illustrating a process of controlling the mobility carrier provided with a vehicle seat and a vehicle provided with the mobility carrier according to the exemplary embodiment of the present invention.

FIG. 1 is a configuration view exemplarily illustrating the mobility carrier C provided with a vehicle seat according to the exemplary embodiment of the present invention. Referring to FIG. 1, the mobility carrier C provided with a vehicle seat according to the exemplary embodiment of the present invention includes: a carrier body 100; carrier wheels 200 provided on the carrier body to move the carrier body outside of a vehicle V; a seat 300 (310, 320, 330, and 340) provided on the carrier body such that a user can be accommodated thereon; an operating portion 400 allowing the user accommodated on the seat to control the mobility carrier C or the vehicle V; and a carrier controller 500 communicating with a vehicle controller of the vehicle from outside of the vehicle V, if verified through communications with the vehicle controller, controlling the carrier wheels so that the carrier body enters a cabin of the vehicle V, and communicating with the vehicle controller to control a driving unit of the vehicle V via the operating portion 400.

The user can use the mobility carrier according to an exemplary embodiment of the present invention as a personal mobility vehicle outside of a vehicle in a position in which the user is accommodated on the seat. When the mobility carrier has entered the vehicle, the mobility carrier can serve as a seat of the vehicle in the cabin of the vehicle. Alternatively, the seat may be attached to and detached from the mobility carrier according to an exemplary embodiment of the present invention, so that the detached seat may be attached to the vehicle. Furthermore, the mobility carrier may be provided with side panels, a roof, and the like to provide an enclosed compartment, may be only provided with a roof to have a semi-open structure, or may have an entirely-open structure.

In this regard, the mobility carrier should be provided with the seat 300, and the operating portion 400 should be able to control the mobility carrier outside of the vehicle and to control the vehicle within the vehicle. The operating portion 400 may be integrally provided in the mobility carrier or be provided detachable from the mobility carrier. In a case in which the operating portion 400 is detachable from the mobility carrier, the operating portion 400 may be applicable as a mobile device, such as a smartphone, or another smart device of the user.

Furthermore, the battery 600 of the mobility carrier should be used for driving the mobility carrier outside of the vehicle, while be configured such that the battery 600 and a main battery V50 of the vehicle can charge or discharge each other, so that the vehicle and the mobility carrier can operate completely independently of each other.

Due to the present configuration, the user can own and use both the vehicle V and the mobility vehicle. The user may be free from separately storing or housing the mobility vehicle, may be free from the problem of individually charging the mobility vehicle, and can more actively use the mobility vehicle in a wider variety of environments, so that convenience of life may be obtained.

In this regard, the mobility carrier C according to an exemplary embodiment of the present invention is provided with the carrier body 100. The carrier body 100 is configured as a vehicle body of the mobility vehicle essentially having a certain volume, since the battery 600, the seat 300, and the like should be provided thereon.

Furthermore, the carrier wheels 200 are provided on the carrier body 100, allowing the carrier body 100 to move outside of the vehicle. As illustrated, the carrier wheels 200 serve as means for moving the mobility carrier outside of the vehicle. Within the vehicle, the carrier wheels 200 allow the mobility carrier C to move in a limited range, so that the position of the user accommodated thereon may be changed within the vehicle. For example, the carrier wheels 200 may be provided with in-wheel motors. When the mobility carrier C is accommodated and fixed within the vehicle, the carrier wheels 200 may be retracted into the lower portion of the mobility carrier C, so that the mobility carrier C may be fixed within the vehicle or the position of the seat may be lowered.

Furthermore, the seat 300 is provided in the carrier body 100 for the user to be accommodated thereon. The seat 300 essentially allows the user to be accommodated thereon. The user can use the seat 300 as the seat of the mobile vehicle outside of the vehicle and as the vehicle seat within the vehicle.

Furthermore, the mobility carrier C is provided with the operating portion 400. The operating portion 400 allows the user accommodated on the seat 300 to control the mobility carrier or the vehicle. The operating portion 400 essentially includes a steering wheel 410 and a monitor 420. The steering wheel 410 allows the user to drive the mobility carrier outside of the vehicle and drive the vehicle within the vehicle. The present configuration can reduce components while improving the convenience of use and intuitiveness of the user.

Furthermore, the carrier controller 500 communicates with the vehicle controller V10 outside of the vehicle. If the carrier controller 500, located outside of the vehicle, is verified by the vehicle controller V10, the carrier controller 500 can control the carrier wheels 200, allowing the carrier body 100 to enter the cabin of the vehicle. Furthermore, the carrier controller 500, communicating with the vehicle controller V10, enables the user to control a driving unit of the vehicle via the operating portion 400.

Due to the above-described components, the mobility carrier can properly serve as the mobility vehicle, as well as the vehicle seat and the steering wheel of the vehicle. Accordingly, the mobility carrier has an optimal structure, by which the number of components thereof may be reduced.

The carrier body 100 is provided with the carrier battery 600 in the lower portion thereof to supply driving energy to the carrier wheels 200, so that the mobility carrier may be used as an independent mobility vehicle outside of the vehicle. Furthermore, when the mobility carrier is fitted within the vehicle, the carrier controller 500 allows the carrier battery 600 to be charged using the main battery V50 of the vehicle, liberating the user from the problem of charging the carrier at home.

In a case in which the mobility carrier is fitted within the vehicle, in an emergency in which the vehicle is discharged or the state of charge of the main battery V50 of the vehicle is insufficient, the carrier controller 500 can charge the main battery V50 of the vehicle using the carrier battery 600, so that the carrier battery 600 can serve as an emergency battery of the vehicle. Furthermore, due to the present configuration, the user can operate the vehicle in an emergency by replacing the carrier battery 600. That is, the carrier battery 600 can serve as the battery of the mobility carrier while provided as an auxiliary battery of the vehicle.

Furthermore, the seat 300 is connected to the carrier body 100 via a moving portion 700, such that the seat 300 can move above the carrier body. That is, in a case in which the mobility carrier is fitted within the vehicle, the seat 300 is configured as the vehicle seat. In the instant case, the user can completely realize functions of a conventional vehicle seat, such as sliding, tilting, and rotation, by controlling the moving portion 700. Since the moving portion 700 connects the seat 300 and the carrier body 100, the user can adjust the position of the seat in both a mobility mode and a vehicle mode. Furthermore, although the mobility carrier C is fixed to the floor of the vehicle, the seat 300 may be moved separately via the moving portion 700, such that safety may be obtained from a collision and the convenience of the user may be satisfied.

Furthermore, the operating portion 400 may include the steering wheel 400 to steer the carrier wheels 200 of the mobility carrier C or driving wheels V30 (or wheels) of the vehicle V. That is, the operating portion 400 can separately steer the mobility vehicle and the vehicle via the steering wheel 410, and information regarding driving conditions of the mobility vehicle or the vehicle may be displayed on the monitor 420.

In this regard, the carrier controller 500 causes the carrier wheels 200 to be steered via the steering wheel 410 in a case in which the mobility carrier is located outside of the vehicle while causing the driving wheels V30 of the vehicle to be steered via the steering wheel 410 in a case in which the mobility carrier is fitted within the vehicle.

Furthermore, in a case in which the vehicle according to an exemplary embodiment of the present invention is an autonomous vehicle, if the vehicle is in an autonomous driving mode, the carrier controller 500 causes the authority of control of the driving unit of the vehicle to be owned by the vehicle controller V10, so that autonomous driving is not hindered even when the user manipulates the steering wheel 410 in S100, S110, S120, and S130. In the autonomous driving mode, when functions are matched such that the mobility carrier may be manipulated by manipulating the steering wheel 410, the convenience of the user may be improved. In the instant case, the user can move both the mobility carrier and the seat, so that the degree of freedom within the space of the vehicle cabin may be further increased.

Furthermore, in a manual driving mode of the vehicle, the carrier controller 500 can cause the authority of control of the driving unit of the vehicle to be owned by the operating portion 400 and the carrier controller 500 in S140, so that the user can control the vehicle. Since the user controls the steering wheel 400, to which the or she is accustomed, the degree of difference may be minimized even when the object to control is changed from the mobility carrier to the vehicle. Furthermore, the number of components may be reduced.

Furthermore, in a case in which a plurality of mobility carriers is fitted within a single vehicle, i.e., a plurality of mobility carriers is fitted within a single vehicle and a plurality of seats of the mobility carriers is provided within the single vehicle, in the manual driving mode of the vehicle, the authority of control of the driving unit of the vehicle may be owned by the operating portion and the carrier controller of the mobility carrier which may be controlled by the user in S350.

As illustrated in FIG. 6, in S300, the authority of control of the driving unit of the vehicle is determined via communications between the vehicle controller and the carrier controllers of the mobility carriers, and the authority of control of the driving unit may be sequentially owned by the carrier controller in the driver's seat, the carrier controller in the front passenger's seat, and the carrier controller in a rear passenger's seat. That is, since the driving of the vehicle is typically controlled from the driver's seat side, it is determined whether or not the corresponding mobility carrier owns the authority of control in S310 and S312. If not, it is determined whether or not the mobility carrier in the front passenger's seat owns the authority of control in S320 and S322. If the mobility carrier in the front passenger's seat does not own the authority of control, it is determined whether or not the mobility carrier in the rear passenger's seat owns the authority of control in S330 and 332. The position of the mobility carrier owning the authority of control may be previously set. Alternatively, the mobility carriers may be previously assigned with different levels of authority of control, which can be checked as required.

A case in which the authority of control is owned by no mobility carrier corresponds to a case in which no driver is located within the vehicle. Thus, in S340, the manual driving mode cannot be performed, and the autonomous driving mode may be performed or the vehicle should be stopped or parked for the sake of safety.

In the autonomous driving mode of the vehicle or in an emergency, in S250 and S260, the carrier controller 500 can lock the carrier wheels 200, preventing the mobility carriers from moving within the vehicle. Consequently, it is possible to obtain safety from a collision. The user can set an intended seat position by manipulating the seat 300 via the moving portion 700.

Since the seat 300 is mounted on the carrier body 100 via the moving portion 700, the seat 300 is movable above and relative to the carrier body. In the autonomous driving mode of the vehicle, the carrier controller 500 allows the moving portion 700 to be manipulated, so that the seat may be moved on the mobility carrier while the mobility carrier is unmovable within the vehicle.

Furthermore, the carrier controller 500 can differently limit a range in which the moving portion can move, depending on whether or the carrier controller 500 owns the authority of control of the driving unit of the vehicle. That is, in the autonomous driving mode, a relatively-wider range of movement of the seat, including rotation, is allowed. However, in the manual driving mode, specific types of movement, such as tilting or reclining, may be allowed for the sake of safety.

Furthermore, the vehicle provided with the above-described mobility carrier includes a moving board V60 and the vehicle controller V10. The moving board V60 is mounted in the lower portion of the vehicle V to be slidable laterally with respect to the vehicle so that moving board V60 may be spread outwards from the vehicle or be retracted into the lower portion of the vehicle. The vehicle controller V10 controls the moving board V60 to be spread laterally from the vehicle so that the mobility carrier C can enter or exit the vehicle via the moving board V60 in a case in which it is necessary for the mobility carrier C outside the vehicle to enter the vehicle or the mobility carrier C within the vehicle to exit the vehicle.

Furthermore, in a case in which it is necessary for the mobility carrier to move from the current vehicle to another vehicle, in S200, S210, S220, S230, and S240, the vehicle controller V10 determines whether or not the vehicle has stopped and checks an obstacle around the vehicle, slides the moving board V60 laterally from the vehicle, and if it is necessary for the mobility carrier to move from the cabin of the vehicle to the ground, slides the moving board V60 laterally from the vehicle and pivots the moving board V60 downwards, so that the external edge portion of the moving board V60 touches the ground.

FIG. 3 is a view exemplarily illustrating the moving board of the vehicle provided with the mobility carrier according to the exemplary embodiment of the present invention. The moving board V60 is provided, as V60-1 below the main battery V50 to serve as a panel to protect the main battery V50. Furthermore, when the carrier enters or exits the vehicle, the moving board V60 slides laterally and tilted upwards, as V60-2. Afterwards, when the mobility carrier is to move to another vehicle, the moving board V60 is oriented horizontally as V60-3, so that the carrier can easily move to the other vehicle. When the mobility carrier is to move to the ground, the external edge portion of the moving board V60 is lowered as V60-2 to the ground to be inclined, provided as a movable ramp. Accordingly, the mobility carrier can more easily exit the vehicle along the ramp.

This control operation may be performed in the same manner in the case in which the mobility carrier enters the vehicle, allowing the mobility carrier to more easily move and more effectively protect the main battery of the vehicle.

Figure 7:
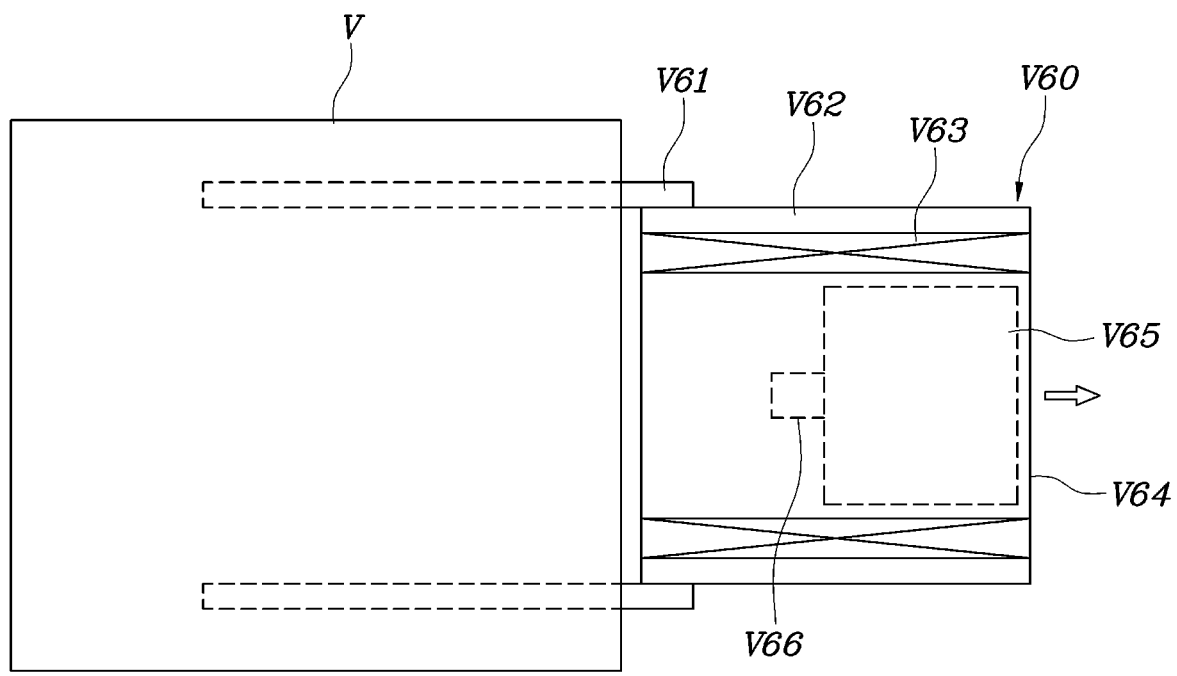
FIG. 7, FIG. 8 and FIG. 9 are views illustrating the operation process of the moving board of the vehicle provided with the mobility carrier according to an exemplary embodiment of the present invention.
Figure 8:
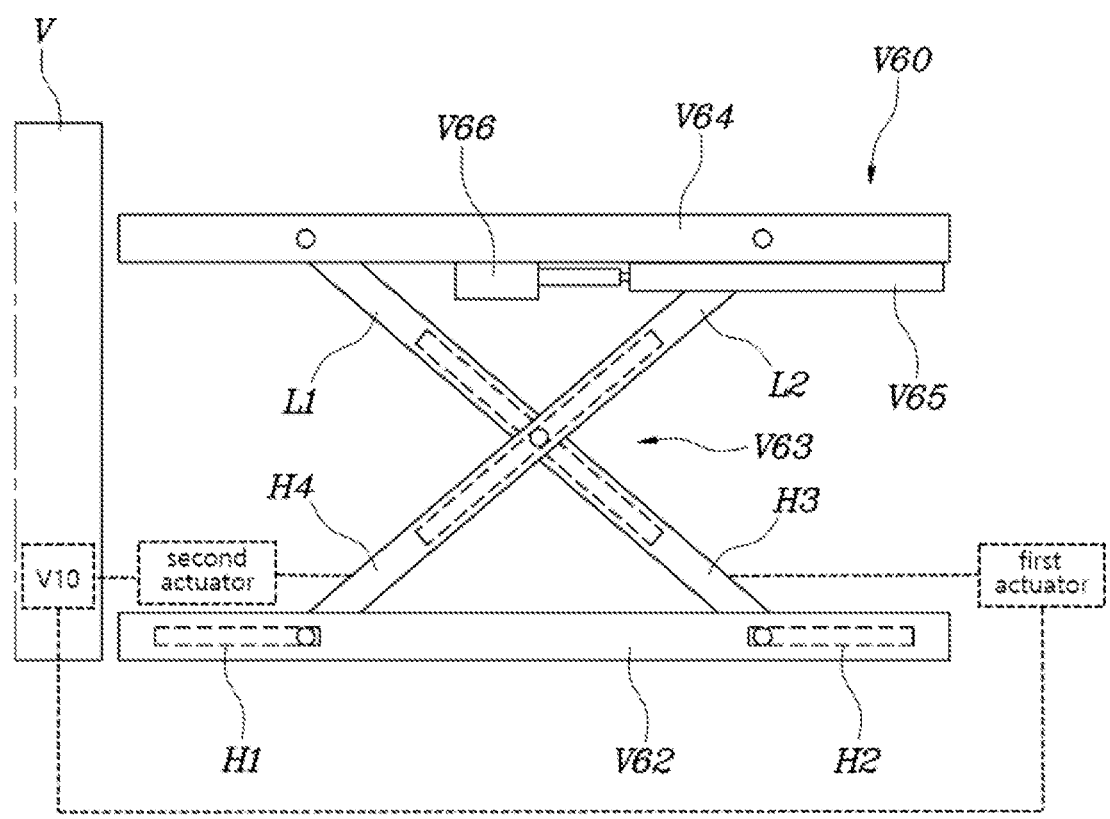
Figure 9:
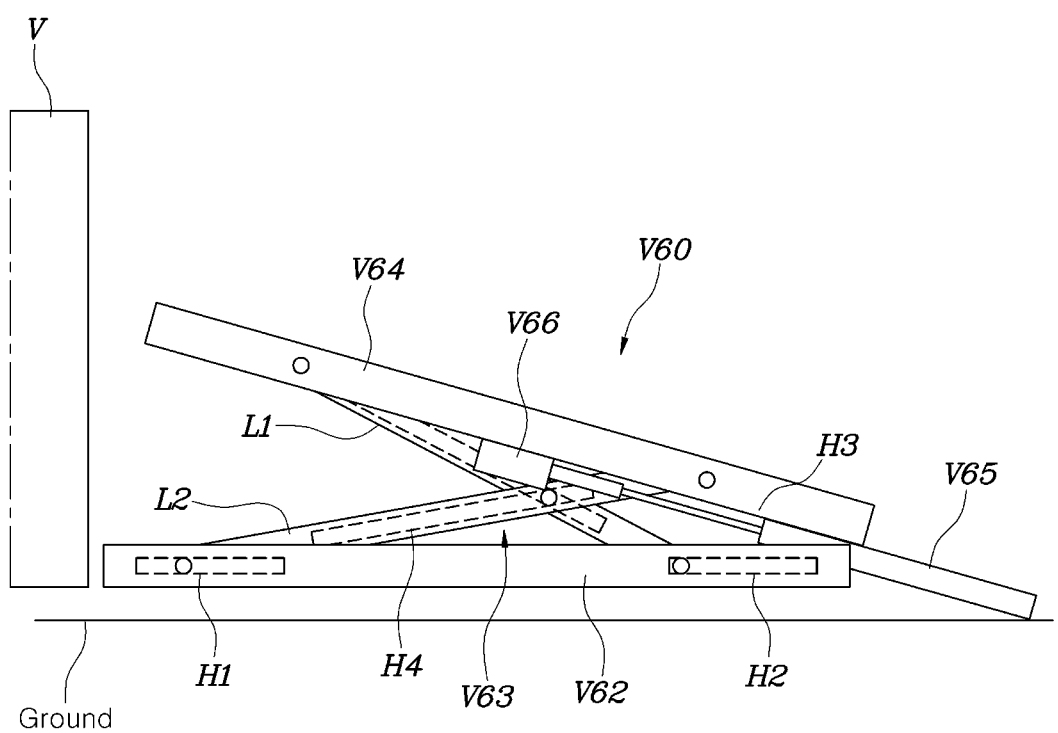

FIG. 7, FIG. 8 and FIG. 9 are views illustrating the operation process of the moving board of the vehicle provided with the mobility carrier according to an exemplary embodiment of the present invention. With reference to FIGS. 7 to 9, the moving board V60 will be described in more detail. The moving board is ordinarily provided in the lower portion of the vehicle to protect the high-voltage main battery of the vehicle. In a case in which the moving board is used, the moving board slides outwards from the vehicle, as illustrated in FIG. 7. Rails V61 are provided to extend in the transverse direction of the vehicle V, such that rails V62 of the moving board V60 slide along the rails V61. The rails V62 of the moving board V60 may be slid using a separate motor or electromagnets.

FIG. 8 illustrates a process of lifting the moving board. After the moving board slides outwards, the moving board is lifted upwards using X-shaped links L1 and L2. The bottom end portions of the X-shaped links L1 and L2 are connected to the rails V62 of the moving board via slits H1 and H2. A plate V64 is connected to the top end portions of the X-shaped links L1 and L2. Due to the present configuration, when the X-shaped links L1 and L2 are driven to be erected using a separate motor or the like, the plate V64 is lifted upwards, as illustrated in FIG. 8. Consequently, the lifting movement of the moving board may be realized.

In an exemplary embodiment of the present invention, a first motor is connected to a lower end of link L1 which is coupled in the slit H1 by a first hinge J1 and a second motor is connected to a lower end of link L2 which is coupled in the slit H2 by a second hinge J2 and the first motor and the second motor are connected to the vehicle controller such that the displacements of the lower end of link L1 and the lower end of link L2 are controlled by the controller.

In an exemplary embodiment of the present invention, the link L1 and link L2 include slits H3 and H4 and the links L1 and L2 are coupled by a hinge J3 which slides along the slits H3 and H4.

Furthermore, FIG. 9 illustrates the inclination and extension of the moving board. As illustrated in FIG. 9, when the bottom end portions of the X-shaped links L1 and L2 are controlled to be at different intended points, the X-shaped links L1 and L2 are mounted asymmetrically, so that the plate V64 is inclined. This is possible since the links L1 and L2 are connected to the slits H3 and H4 of the rails V62 via hinge pins.

In a position in which the plate V64 is inclined, when a motor V66 is driven, an extension V65 protrudes from the plate V64, activating an extension function. In the instant case, the extension V65 extends toward the ground to reduce the distance between the vehicle and the ground, allowing the mobility carrier to more easily enter and exit the vehicle.

According to the mobility carrier provided with a vehicle seat and the vehicle provided with the mobility carrier according to an exemplary embodiment of the present invention, the mobility carrier may be ordinarily used as a mobility vehicle outside of the vehicle while provided as a seat of the vehicle when fitted within the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A mobility carrier comprising:
a carrier body;
carrier wheels provided on the carrier body to move the carrier body into or outside of a vehicle;
a seat provided on the carrier body for a user to be accommodated thereon;
an operating portion configured of allowing the user accommodated on the seat to control the mobility carrier or the vehicle; and
a carrier controller configured of communicating with a vehicle controller of the vehicle from outside of the vehicle, when verified through communications with the vehicle controller, of controlling the carrier wheels so that the carrier body enters a cabin of the vehicle, and of communicating with the vehicle controller to control a driving unit of the vehicle via the operating portion,
wherein when the mobility carrier is fitted within the vehicle, functions of sliding, tilting, and rotation of the seat are performed by controlling a moving portion, and
wherein the carrier controller is configured to control authority of control of the driving unit of the vehicle to be owned by the vehicle controller when the vehicle is in an autonomous driving mode and to be owned by the operating portion and the carrier controller of the mobility carrier when the vehicle is in a manual driving mode.

2. The mobility carrier of claim 1, further including a carrier battery provided in a lower portion of the carrier body to provide energy to the carrier wheels.

3. The mobility carrier of claim 2, wherein, when the mobility carrier is fitted within the vehicle, the carrier controller is configured to charge the carrier battery using a battery of the vehicle.

4. The mobility carrier of claim 2, wherein, when the mobility carrier is fitted within the vehicle, the carrier controller is configured to charge a battery of the vehicle using the carrier battery when the battery of the vehicle has a value of a state of charge (SOC) lower than a predetermined value.

5. The mobility carrier of claim 1, wherein the operating portion includes a steering wheel to steer the carrier wheels or wheels of the vehicle.

6. The mobility carrier of claim 5, wherein the carrier controller is configured to control the carrier wheels to be steered via the steering wheel of the mobility carrier when the mobility carrier is located outside the vehicle and is configured to control the wheels of the vehicle to be steered via the steering wheel of the mobility carrier when the mobility carrier is fitted within the vehicle.

7. The mobility carrier of claim 1, wherein the seat is mounted on the carrier body via the moving portion to be movable above and relative to the carrier body.

8. The mobility carrier of claim 1, wherein, when a plurality of mobility carriers is fitted within the vehicle and the vehicle is in the manual driving mode, the authority of control of the driving unit of the vehicle is owned by the operating portion and the carrier controller of a mobility carrier that are configured to be controlled among the plurality of mobility carriers.

9. The mobility carrier of claim 8, wherein the authority of control of the driving unit of the vehicle is determined via communications between the vehicle controller and carrier controllers in the plurality of mobility carriers, and the authority of control of the driving unit is sequentially owned by a first carrier controller in a driver's seat in the vehicle among the carrier controllers, a second carrier controller in a front passenger's seat in the vehicle among the carrier controllers, and a third carrier controller in a rear passenger's seat in the vehicle among the carrier controllers.

10. The mobility carrier of claim 1, wherein, in the autonomous driving mode of the vehicle, the carrier controller is configured to lock the carrier wheels, preventing the mobility carrier from moving within the vehicle.

11. The mobility carrier of claim 10, wherein the seat is mounted on the carrier body via the moving portion to be movable above and relative to the carrier body, and, in the autonomous driving mode of the vehicle, the carrier controller is configured to allow the moving portion to be manipulated, so that the seat is moveable on the mobility carrier while the mobility carrier is unmovable within the vehicle.

12. The mobility carrier of claim 11, wherein the carrier controller is configured to differently limit a range in which the moving portion is allowed to move, depending on when the carrier controller owns an authority of control of the driving unit of the vehicle.

13. A vehicle comprising:
the mobility carrier as claimed in claim 1,
a moving board mounted in a lower portion of the vehicle to be slidable laterally with respect to the vehicle to be selectively spread outwards from the vehicle or retracted into the lower portion of the vehicle; and
the vehicle controller configured for controlling the moving board to be spread laterally from the vehicle so that the mobility carrier enters or exits the vehicle via the moving board when the mobility carrier outside the vehicle is required to enter the vehicle or the mobility carrier within the vehicle is required to exit the vehicle.

14. The vehicle of claim 13, wherein the vehicle controller is configured to control the moving board to slide laterally from the vehicle when the mobility carrier is required to move from the vehicle to another vehicle.

15. The vehicle of claim 13, wherein the vehicle controller is configured to control the moving board to slide laterally from the vehicle and pivot downwards of the vehicle, so that an external edge portion of the moving board touches a ground, when the mobility carrier is required to move from the cabin of the vehicle to the ground.

16. The vehicle of claim 13, wherein the moving board includes:
a first link and a second link;
a plate pivotally connected to upper portions of the first and second links which are aligned in crossing each other;
a rail including a first slit into which a lower end portion of the first link is slidably coupled and a second slit into which a lower end portion of the second link is slidably coupled; and
a first actuator engaged to the vehicle controller and coupled to the lower end portion of the first link and a second actuator engaged to the vehicle controller and coupled to the lower end portion of the second link.

17. The vehicle of claim 16,
wherein the first link includes a third slit and the second link includes a fourth slit, and
wherein a hinge is coupled into the third slit of the first link and the fourth slit of the second link.

18. The vehicle of claim 16, further including an extension slidably mounted on the plate and configured to selectively protrude from the plate, according to a signal of the vehicle controller.

19. The vehicle of claim 16, wherein the rail is slidably mounted to the lower portion of the vehicle to be selectively spread outwards from the vehicle or retracted into the lower portion of the vehicle, according to a signal of the vehicle controller.

* * * * *